United States Patent
Chong et al.

(10) Patent No.: US 12,399,897 B2
(45) Date of Patent: Aug. 26, 2025

(54) STATEMENT HINT WITH DATABASE OBJECTS

(71) Applicant: SAP SE, Walldorf (DE)

(72) Inventors: Jaehyok Chong, Seoul (KR); Won Jun Chang, Seoul (KR)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 18/466,312

(22) Filed: Sep. 13, 2023

(65) Prior Publication Data

US 2025/0086178 A1    Mar. 13, 2025

(51) Int. Cl.
*G06F 16/2453*    (2019.01)
*G06F 16/22*    (2019.01)
*G06F 16/242*    (2019.01)

(52) U.S. Cl.
CPC .... *G06F 16/24544* (2019.01); *G06F 16/2282* (2019.01); *G06F 16/242* (2019.01)

(58) Field of Classification Search
CPC ......... G06F 16/24542; G06F 16/24539; G06F 16/24; G06F 16/2455
USPC ....................................................... 707/769
See application file for complete search history.

(56) References Cited

U.S. PATENT DOCUMENTS

| | | | | |
|---|---|---|---|---|
| 8,190,595 | B2* | 5/2012 | Bruno | G06F 16/24 707/718 |
| 11,294,901 | B1* | 4/2022 | Yue | G06F 16/24542 |
| 2009/0070300 | A1* | 3/2009 | Bartels | G06F 16/2455 |
| 2017/0147639 | A1* | 5/2017 | Lee | G06F 16/24539 |

OTHER PUBLICATIONS

"SAP HANA SQL Reference Guide for SAP HANA Platform," https://help.sap.com/docs/HANA_SERVICE_CF/7c78579ce9b14a669c1f3295b0d8ca16?locale=en-US&state=PRODUCTION& version=Cloud, 3 pages, accessed Apr. 11, 2023.
"SAP HANA SQL Reference Guide for SAP HANA Platform," https://help.sap.com/docs/HANA_SERVICE_CF/7c78579ce9c1f3295b0d8ca16?locale=en-US&state=PRODUCTION&version=Cloud, 5 pages, accessed Apr. 11, 2023.
"17 Optimizer Hints," Oracle® Database Performance Tuning Guide, 10g Release 1 (10.1), Part No. B10752-01, https://docs.oracle.com/cd/B12037_01/server.101/b10752/hintsref.htm, 38 pages, accessed Apr. 11, 2023.
Query Hints (Transact-SQL)—SQL Server | Microsoft Learn, https://learn.microsoft.com/en-us/sql/queries/hints-transact-sql-query?view=sql-server-ver16, 26 pages, accessed Apr. 11, 2023.
Hints (Transact-SQL)—SQL Server | Microsoft Learn, https://learn.microsoft.com/en-us/sql/t-sql/queries/hints-transact-sql?view=sql-server-ver16, 1 page, accessed Apr. 11, 2023.
Gupta, Explore the SQL query Hint Option (Fast N), https://www.sqlshack.com/explore-sql-queries-hint-option-fast-n/, 7 pages, Jul. 2, 2020.

(Continued)

*Primary Examiner* — Hung T Vy
(74) *Attorney, Agent, or Firm* — Klarquist Sparkman, LLP

(57) ABSTRACT

A computer implemented method can receive an incoming query statement, identify a database object specified in the incoming query statement, and search a query hint registry for a first hint record which includes the database object and a first hint paired with the database object. Responsive to finding the first hint record in the query hint registry, the method can generate a modified query statement by appending the first hint to the incoming query statement and obtain a query execution plan based on the modified query statement.

20 Claims, 12 Drawing Sheets

(56) References Cited

OTHER PUBLICATIONS

"SAP HANA SQL Reference Guide for SAP HANA Platform," https://help.sap.com/docs/SAP_HANA_PLATFORM/4fe29514fd584807ac9f2aO4f6754767?locale=en-US&state=PRODUCTION&version=2.0.07, 33 pages, accessed Apr. 11, 2023.
"SAP HANA Administration Guide for SAP HANA Platform," https://help.sap.com/docs/SAP_HANA_PLATFORM/6b94445c94ae495c83a19646e7c3fd56?locale=en-US&state=PRODUCTION&version=2.0.07, 6 pages, accessed Apr. 11, 2023.
MySQL Literals—javatpoint, https://www.javatpoint.com/myql-literals#:~:text=The following are the types, Date and Time Literals, 16 pages, accessed Apr. 11, 2023.
Totn SQL, SQL:Literals, https://www.techonthenet.com/sql/literals.php, 2 pages, accessed Apr. 11, 2023.
Wikipedia, "Regular expression," https://en.wikipedia.org/wiki/Regular_expression, 29 pages, accessed Apr. 11, 2023.

* cited by examiner

| Query Statement | Hint | Enabled/Disabled |
|---|---|---|
| select * from t1 where a = $$?$$ | hint1 | E |
| select * from t1 where a = 1234 | hint2 | E |
| select * from t2 where a = $${0,1,2}$$ | hint3 | E |
| select * from t2 where b = $$(0,10)$$ | hint4 | E |
| select * from $$TEMP_{?}$$ where a = 10 | hint5 | D |
| select * from $$TEMP_{?}$$ where a = $${1,2,3}$$ | hint6 | E |
| select * from $$TEMP_{TIMESTAMP}$$ where a = $$(1000,2000]$$ | hint7 | E |
| select * from $$TEMP_{NUMBER}$$ where a = $$?$$ | hint8 | D |
| ... | | |

310 → row 1, 320 → row 2, 330 → row 3, 340 → row 4, 350 → row 5, 360 → row 6, 370 → row 7, 380 → row 8

510 →
```
drop table t1;
create table t1(a int);
alter system add statement hint (no_use_hex_plan) for select * from t1 where a = $$?$$;
select statement_string, hint_string, is_enabled from statement_hints;
```

520 →
```
select * from t1 where a = 1234;
select compilation_options,* from sys.m_sql_plan_cache_ where statement_string like 'select * from t1 where a = 1234%';
```

530 →
```
alter system disable statement hint for select * from t1 where a = $$?$$;
select statement_string, hint_string, is_enabled from statement_hints;
```

540 →
```
select * from t1 where a = 2345;
select compilation_options,* from sys.m_sql_plan_cache_ where statement_string like 'select * from t1 where a = 2345%';
```

550 →
```
alter system enable statement hint for select * from t1 where a = $$?$$;
select statement_string, hint_string, is_enabled from statement_hints;
```

560 →
```
select * from t1 where a = 3456;
select compilation_options,* from sys.m_sql_plan_cache_ where statement_string like 'select * from t1 where a = 3456%';
```

570 →
```
alter system remove statement hint for select * from t1 where a = $$?$$;
select statement_string, hint_string, is_enabled from statement_hints;
```

580 →
```
select * from t1 where a = 4567;
select compilation_options,* from sys.m_sql_plan_cache_ where statement_string like 'select * from t1 where a = 4567%';
```

STATEMENT HINT WITH DATABASE OBJECTS

BACKGROUND

Queries (also referred to as "query statements") are commands used in database management systems that request or instruct data retrieval. A query plan (also referred to as "query execution plan") is a sequence of steps that a database management system (DBMS) executes in order to complete a query. When a query is run for the first time in the DBMS, the query can be compiled by a query optimizer to generate a corresponding query plan, which can be stored in memory called query plan cache, or simply plan cache. Thus, when the same query is run again, the DBMS does not need to regenerate the query plan. Instead, it can reuse the cached query plan stored in the query plan cache, thereby improving efficiency of the DBMS. Query optimization refers to the overall process of attempting to choose a most efficient query plan, among many candidate query plans, to execute a query.

Statement hints (or simply "hints") in queries are special instructions or directives provided by users to the query optimizer, specifying how the query should be executed. The hints can provide additional information about the desired query plan, join order, index usage, parallelism, or other optimizations. By using hints, users can have more control over the query optimization process and guide the database engine towards the preferred approach for query execution. However, adding hints to individual queries can be tedious and error prone. Additionally, there is an increased complexity for processing queries with hints (e.g., in query parsing, cache management, etc.). Thus, there is room for improvement for optimizing queries with hints.

BRIEF DESCRIPTION OF THE DRAWINGS

FIG. 3 is depicts an example hint registry.

FIG. 5 depicts some example query commands illustrating usages of patterned query statements with hints.

DETAILED DESCRIPTION

Example 1

Overview of Query Statements with Hints

Figure 1:
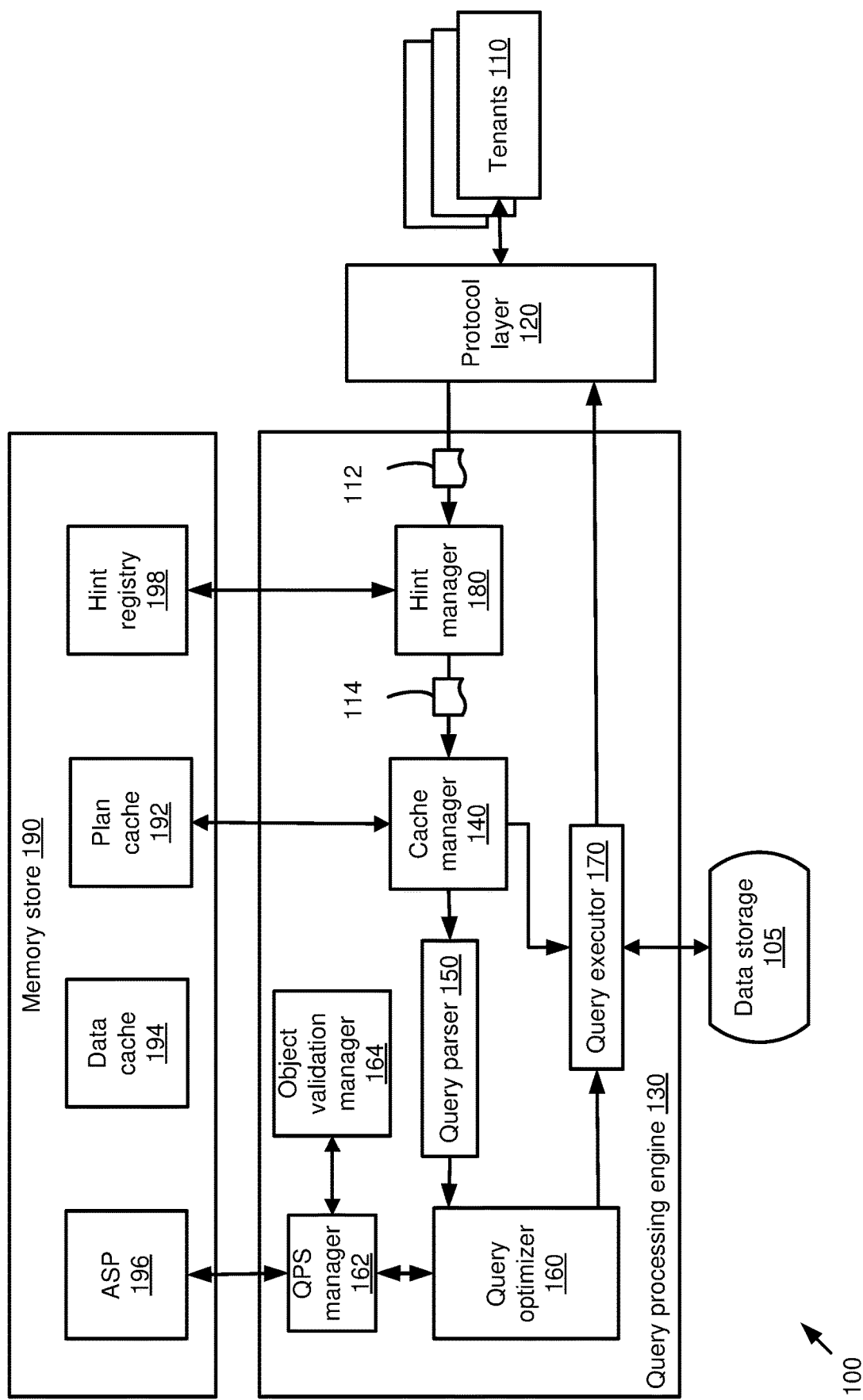
FIG. 1 is an overall block diagram of an example database management system supporting processing patterned query statements with hints.

Hints can play a specific role in query optimization by providing additional information or instructions to the query optimizer. For example, hints can serve as directives to the query optimizer, instructing it to choose a specific query execution plan. The query optimizer uses various algorithms and heuristics to determine the most efficient plan. But in some cases, the query optimizer may not make the optimal choice. This can happen, for example, upgrades to the query optimizer may cause changes to the compiled query execution plans, and some queries may regress in performance after such upgrades. Hints allow users to override the query optimizer's decision and guide it towards a preferred plan. For example, hints can also be used to influence the join order and/or join methods used by the query optimizer, which can impact the overall query performance. Additionally, hints can be used to guide the query optimizer in using specific indexes, applying specific query transformations, fine-tuning parallel query processing based on available system resources and workload characteristics, and so on.

For illustration purposes, query statements (with or without hints) written for SAP HANA database (provided by SAP SE of Walldorf, Germany) are used hereinafter as examples, although it is to be understood that the same principles described herein can be used for query statements (with or without hints) written for other databases.

In some database systems, hints can be explicitly specified in query statements using a special syntax recognized by the database system. For example, in SAP HANA, a user can explicitly specify one or more hints in a query statement using a "WITH HINT" clause, e.g.: SELECT*FROM T1 WITH HINT (IGNORE_PLAN_CACHE).

In some database systems, hints can also be added to query statements by using specific query commands, which can automatically add specific hints to a target query (or a statement hash generated for a target query) entered by users. For example, in SAP HANA, hints can be added to a target query by an ALTER SYSTEM ADD STATEMENT HINT query command, e.g.:

ALTER SYSTEM ADD STATEMENT HINT (NO_CS_JOIN, NO_CS_UNION_ALL) FOR SELECT*FROM AAA

Generally, in existing technologies, users can add statement hints to literal queries or queries having specified objects. Literal queries are queries including literals (or constants) that are explicitly specified and not represented by parameters or identifiers. A literal can be a number, a character, a string, a Boolean value, a data and/or time value, etc. In other words, literal queries are unparameterized queries.

As an example, two literal queries Q1 and Q2 are listed below, in which constants (1234 and 4567) are specified in the where clause of the queries:

Q1 (without hint): select*from a where a=1234

Q2 (without hint): select*from a where a=4567

To add the hint NO_USE_HEX_PLAN for the queries Q1 and Q2, existing technologies allow a user to apply the Alter commands to the queries Q1 and Q2 individually, that is:

Q1 (with hint): alter system add statement hint (NO_USE_HEX_PLAN) for select*from a where a=1234

Q2 (with hint): alter system add statement hint (NO_USE_HEX_PLAN) for select*from a where a=4567

Some structured query language (SQL) query scripts (e.g., SQLScript of SAP HANA) can generate temporary tables to support complex data manipulation and processing within the scripts. Temporary tables are created during runtime and exist only during execution of the scripts. Temporary tables can be used to store and manipulate intermediate results, temporary data sets, or aggregates, allowing for more efficient and organized data processing.

As an example, a SQLScript can generate the following two queries Q3 and Q4 with respective temporary tables (temp_01234 and temp_12412). Each temporary table can be created with a different name each time the SQLScript is executed.

Q3 (without hint): select*from temp_01234 where a=10

Q4 (without hint): select*from temp_12412 where a=10

Similarly, to add the hint NO_USE_HEX_PLAN statement hint for the queries Q3 and Q4, existing technologies allow a user to apply the Alter commands to the queries Q3 and Q4 individually:

Q3 (with hint): alter system add statement hint (NO_USE_HEX_PLAN) for select*from temp_01234 where a=10

Q4 (with hint): alter system add statement hint (NO_USE_HEX_PLAN) for select*from temp_12412 where a=10

Although existing technologies allow users to add hints to literal queries or queries including names of temporary objects (e.g., temporary tables), such hints can only be added individually for those queries, that is, a separate Alter command must be written for each literal query or each query including a temporary object. Such a process of adding hints to queries is not only inefficient and time consuming, but also is prone to human errors (e.g., due to typos).

Further, queries with hints can increase the complexity of query processing. For example, a query parser needs to differentiate queries with and without hints. Additionally, management of plan cache can be complicated because the query optimizer can generate different query plans for the same incoming query with and without a hint, which can impact the decision making on which query plan should be saved in the plan cache (and which query plan in the plan cache should be evicted).

Additionally, there are situations where it is desirable to add hints to all queries accessing a particular database object (e.g., a specific table, a specific view, etc.). In one example situation, a database system crashes when processing queries accessing a monitoring view. If a THROW_ERROR hint is added to those queries, such crash can be prevented. However, it is difficult to find all query statements accessing the monitoring view according to existing technologies. In another example situation, a database system crashes when cost estimation of queries involves evaluating data samples extracted from a database table (e.g., due to unsupported data type of the data samples). If an ESTIMATION_SAMPLES (0) hint is added to those queries (e.g., such a hint would disable sample-based estimation and use statistical analysis or other techniques for cost estimation), such crash can be avoided. However, because the database objects were stacked and used in different places, it is difficult to identify all queries that involve evaluating data samples from the database table and would need this hint.

The technologies described herein overcome many of the technical problems described above. Specifically, a solution is provided for more efficient handling of query statements with hints. As described more fully below, the technologies described herein support using patterned query statements with hint, which allows users to "parameterize" literal queries and/or queries including temporary object names (e.g., generated by running an SQL script) by using wildcard expressions. Each wildcard expression can serve as a placeholder and represent a plurality of literals or a plurality of temporary object names. Users can add hints to these "parameterized" queries, instead of to each individual query separately. Additionally, the technologies described herein support adding hints to any queries accessing one or more specific database objects. These features can vastly increase the usability of statement hints and extend the scope where the hints can be used in query processing.

Example 2

Example Database Management System Supporting Patterned Query Statements with Hints FIG. 1 shows an overall block diagram of an example database management system 100 which supports processing patterned query statements with hints.

The database management system 100 can be configured to support multi-tenancy. As shown, the database management system 100 includes a query processing engine 130 and a protocol layer 120 which serves as an interface between one or more tenants 110 and the query processing engine 130. For example, the protocol layer 120 can implement a server name indication protocol by which the tenants 110 can connect to the query processing engine 130. Each tenant 110 represents a group of users who can access a tenant-specific database managed by the database management system 100.

The query processing engine 130 can include a cache manager 140, a query parser 150, a query optimizer 160, a query executor 170, and a hint manager 180. The cache manager 140 can access a plan cache 192 in a memory store 190. The plan cache 192 represents a fast-access memory space configured to store previously compiled query plans.

An incoming query 112 sent from a tenant 110 can be processed by the hint manager 180 to output a query 114, which can be the same as or different from the incoming query 112. The hint manager 180 maintains a query hint registry 198 (or simply "hint registry"), which can be located in the memory store 190.

As described further below, the hint registry 198 can include one or more entries (also referred to as "hint records"). Each hint record can include a hint target and a hint paired to the hint target. As described herein, although the "hint" is expressed in a singular form, it should be understood that the "hint" in each hint record can be a single hint (e.g., (NO_USE_HEX_PLAN) or multiple hints (e.g., (NO_CS_JOIN, NO_CS_UNION_ALL)).

In some examples, a hint target can be a query statement, which can also be referred to as a "target query statement." In this scenario, the hint in the hint record is paired with the target query statement. The target query statement can be patterned (e.g., with wildcard expressions), also referred to as "patterned query statement," or non-patterned (e.g., literal queries, queries including explicit object names, etc.), also referred to as "non-patterned query statement." In some examples, a target query statement can explicitly specify a hint (e.g., by using a "WITH HINT" clause in SAP HANA).

In some examples, a hint target can be one or more database objects, which can also be referred to as "target objects." In this scenario, the hint in the hint record is paired with the one or more target objects.

Some of the incoming queries 112 can include hint commands, such as commands for adding a hint, removing a hint, enabling a hint, disabling a hint, etc. Based on the received hint commands, the hint manager 180 can update the hint registry 198. For example, responsive to receiving a command to add a hint to a target query statement, the hint manager 180 can add the pair of target query statement and the hint to the hint registry 198. Conversely, responsive to receiving a command to remove hint for a target query statement, the hint manager 180 can delete the pair of target query statement and the corresponding hint from the hint registry 198. The hint manager 180 can also enable or disable hint registered in the hint registry 198 based on the received hint commands. Similarly, query commands can be used to instruct the hint manager 180 to add, delete, disable, or enable hints paired with specific target objects.

The hint manager 180 can be configured to perform a preliminary grammar check for the incoming queries 112. For example, the hint manager 180 can check if any of the hint commands contains syntactic and/or semantic errors. In some implementations, the patterned query statements can only be used in conjunction with the hints. Thus, if the hint manager 180 finds that the incoming query 112 is a data retrieval command (e.g., a SELECT statement) which includes a wildcard expression, the hint manager 180 can throw an error.

The hint manager 180 can also be configured to search the hint registry 198 to identify if an incoming query 112 matches one of the hint records stored in the hint registry 198. A hint record is deemed to match the incoming query 112 if a target query statement included in the hint record matches the incoming query 112, or if the target object(s) specified in the hint record appear in the incoming query 112. If a matching hint record is found, the hint specified in the hint record can be appended (or added) to the incoming query 112. In other words, the incoming query 112 is modified by the hint included in the hint record to become a modified query 114 (as an output of the hint manager 180). The modified query 114 can be propagated downstream of the hint manager 180, e.g., processed by the cache manager 140, query parser 150, query optimizer 160, etc. On the other hand, if no matching hint record is found, the incoming query 112 is not modified (i.e., the query 114 output from the hint manager 180 is identical to the incoming query 112), and can be directly passed to the cache manager 140 for query processing.

For hint records containing hint targets that are target query statements, the hint manager 180 can use string comparison to determine if the incoming query 112 matches any of the target query statements. If a target query statement in a hint record is a patterned query statement, a wildcard expression contained in the patterned query statement can match one or more characters of the incoming query when performing the string comparison. For hint records containing hint targets that are target objects, the hint manager 180 can parse the incoming query 112 to determine if the target objects appear in the incoming query 112.

The cache manager 140 receives the query 114 (which can be the incoming query 112 appended with a hint or the unmodified incoming query 112) output from the hint manager 180. The cache manager 140 can evaluate the query 114 to determine if the query 114 has a corresponding (compiled) query execution plan stored in the plan cache 192.

If the cache manager 140 finds no query execution plan in the plan cache 192 that corresponds to the query 114, the query 114 can be analyzed by the query parser 150, which can check if the query 114 contains syntactic and/or semantic errors. After verifying that the query 114 is a valid transactional SQL statement (e.g., SELECT, INSERT, UPDATE, DELETE, MERGE, etc.), the query parser 150 can generate a logical tree in which the query 114 can be executed.

The logical tree can be used by the query optimizer 160 to generate a corresponding query execution plan, which determines how the query 114 will be executed. The query optimizer 160 can be configured to select a query execution plan (among a plurality of query execution plans that are generated based on enumeration of the logical tree) that yields optimal performance. Performance of a query execution plan can be described in terms of cost, which can be time (e.g., time required to execute the query execution plan) and/or burden on computing resources (e.g., processing power and/or memory expended to execute the query execution plan). Cost-based query optimization chooses the query execution plan with the lowest cost among all candidate query execution plans. In practice, although the terms "optimal" and "optimize" are used, the actual best query execution plan may not be selected, but the selected query execution plan is deemed better than others based on data available to the query optimizer 160.

The determined optimal query execution plan can then be sent to the query executor 170 for execution. The query executor 170 can communicate with a data storage or memory space 105 and execute operators in the query execution plan determined by the query optimizer 160. Data retrieved from the data storage or memory space 105 can be returned to the tenant 110 via the protocol layer 120.

As described herein, query compilation refers to the process of converting a query 114 to the optimal query execution plan (e.g., checking syntactic and/or semantic errors, generating the logical tree, and determining optimal query execution plan), as described above. Depending on the complexity of the query 114 (e.g., the number of joined tables, etc.) and the query optimization algorithm, query compilation time can be long (e.g., tens of seconds or more). Thus, to improve operational efficiency, the compiled query execution plan (i.e., the determined most optimal query execution plan) corresponding to the query 114 can be stored in the plan cache 192 so that it can be quickly retrieved and reused if the same query is encountered again in the future.

For example, if the cache manager 140 determines that the query 114 has a corresponding query execution plan stored in the plan cache 192, that query execution plan can be fetched directly from the plan cache 192 and forwarded to the query executor 170 for execution. Thus, in this scenario, operations by the query parser 150 and query optimizer 160 can be bypassed. In other words, the query 114 does not need to be recompiled because its previously compiled query execution plan is available in the plan cache 192.

As noted above, the plan cache 192 can store compiled query execution plans. For each received query 114, the cache manager 140 checks if it has a compiled query execution plan stored in the plan cache 192. If yes, then this cached query execution plan can be reused. This can improve efficiency because it eliminates the time of compiling the query 114 (i.e., regenerating the query execution plan). On the other hand, if the query 114 has no compiled query execution plan stored in the plan cache 192, the query 114 has to be compiled. The compiled query execution plan can then be stored in the plan cache 192 so that when the same query 114 occurs again in the future, fast access to its cached query execution plan is feasible.

If the received query 114 is new (i.e., a first-time query that has not been encountered before), this new query has no corresponding query execution plan in the plan cache 192 and it must be compiled for the first time. On the other hand, if the received query 114 is old (i.e., the same query has been encountered at least once before), whether or not there is a corresponding compiled query execution plan in the plan cache 192 can depend on the size of the plan cache 192 and a plan eviction policy adopted by the cache manager 140.

The plan cache 192 has a limited size. Thus, it may not be able to store all compiled query execution plans. When the plan cache 192 approaches its full capacity, certain query execution plans may have to be evicted (i.e., removed) from the plan cache 192 to make room for new ones according to a predefined plan eviction policy implemented by the cache manager 140. For example, the cache manager 140 can implement a random plan eviction policy which evicts query execution plans from the plan cache 192 in a random manner. In another example, the cache manager 140 can implement a least recently used (LRU) plan eviction policy which removes the least recently used query execution plans first from the plan cache 192. In yet another example, a least frequently used (LFU) plan eviction policy can be used which first evicts the execution policies that are used least often. Many other plan eviction policies can also be used by the cache manager 140.

If the received query 114 includes hint commands (e.g., commands for adding a hint, removing a hint, enabling a hint, disabling a hint, etc.), the cache manager 140 can be configured to perform additional operations on the plan cache 192 (e.g., evicting one or more query execution plans), as described more fully below.

In certain circumstances, performance regression of query execution plans can occur, e.g., due to a system upgrade and/or data change of the database management system 100. To mitigate potential performance regression of query plans, the query optimizer 160 can be configured to capture selected query plans and reuse them if necessary to regenerate the original query plans so as to retain the original performance. The captured query plans can be stored in an abstract SQL plan (ASP) store 194. In the depicted example, the ASP store 194 resides in the memory store 190. In other examples, the ASP store 194 can be stored in a persistence layer and loaded into the memory if needed. The ASP can also be generally referred to as the "abstract query plan."

In practice, the systems shown herein, such as system 100, can vary in complexity, with additional functionality, more complex components, and the like. For example, there can be additional functionality within the query processing engine 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the query statements, the hints, the query plans, and the like can be stored in one or more computer-readable storage media or computer-readable storage devices. The technologies described herein can be generic to the specifics of operating systems or hardware and can be applied in any variety of environments to take advantage of the described features.

Example 3

Example Overall Method of Processing Patterned Query Statements with Hints

Figure 2:
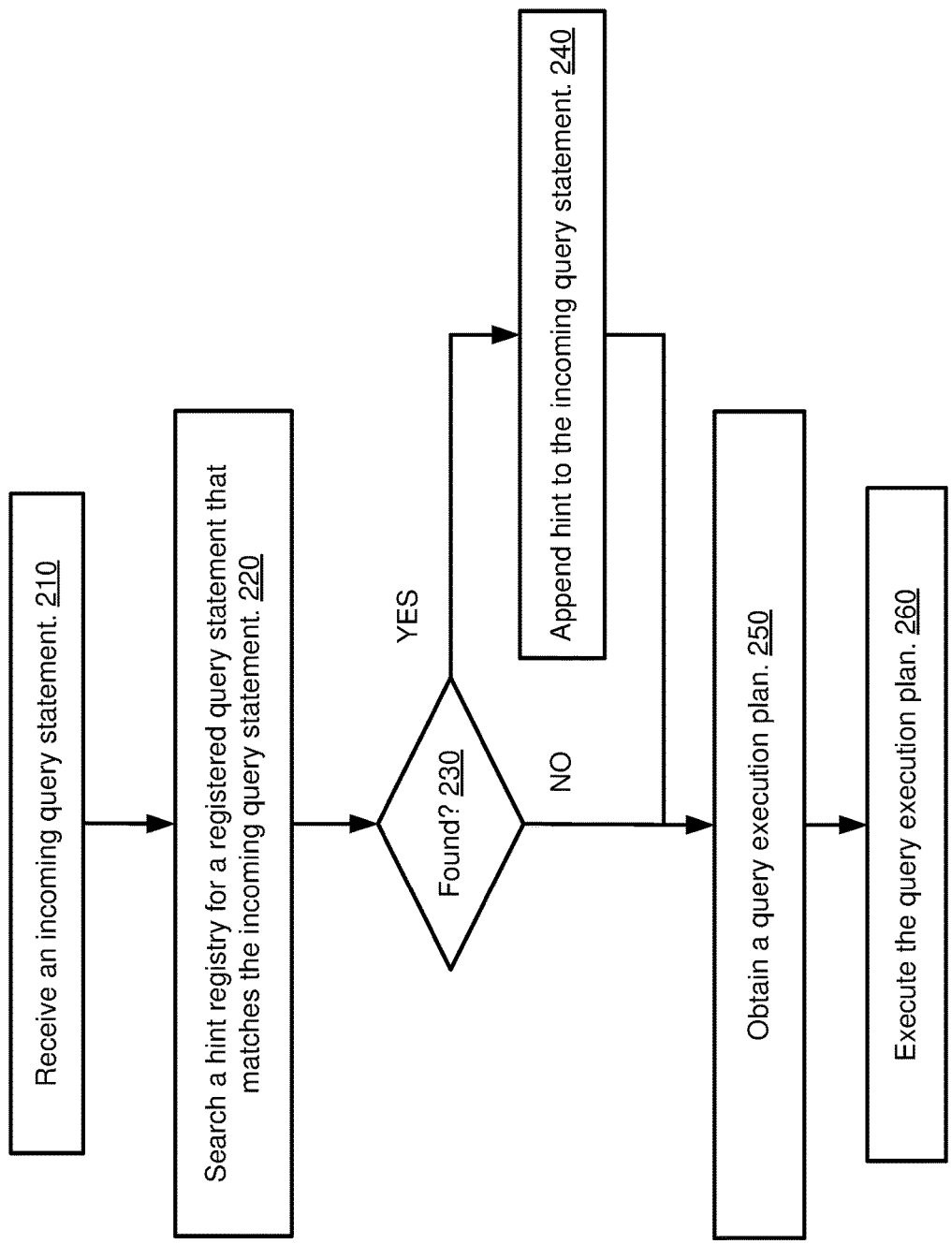
FIG. 2 is a flowchart illustrating an example overall method of processing patterned query statements with hints.

FIG. 2 is a flowchart illustrating an example overall method 200 of processing patterned query statements with hints, and can be performed, for example, by the query processing engine 130 of FIG. 1.

As described above, the hint registry can include one or more hint records, each of which includes a hint target and a corresponding hint paired with the hint target. The hint targets can include target query statements and/or target objects. For simplicity, the method 200 assumes that each hint record in the hint registry includes a target query statement (instead of a target object).

At 210, an incoming query statement (e.g., the incoming query 112) can be received, e.g., by the hint manager 180.

At 220, a hint registry (e.g., the hint registry 198) can be searched (e.g., by the hint manager 180) to identify a registered query statement (e.g., a target query statement included in a hint record) that matches the incoming query statement. Some of the target query statements in the hint registry can be patterned, that is, having wildcard expressions, as described more fully below.

At 230, a condition check can be performed. If it is found that a registered (or target) query statement matches the incoming query statement, the method can proceed to 240, where the hint paired with the matching registered query statement can be appended to the incoming query statement (e.g., by the hint manager 180). Thus, the output of the hint manager is a modified query (e.g., the query 114) which combines the incoming query statement with the hint. On the other hand, if no registered (or target) query statement matches the incoming query statement, the incoming query statement will remain unmodified, that is, the output of the hint manager (e.g., the query 114) is identical to the incoming query statement.

At 250, a query execution plan can be obtained for the query (e.g., the query 114) output from the hint manager. In some examples, the query execution plan can be generated by a query optimizer (e.g., the query optimizer 160). In some examples, the query execution plan was previously generated and can be retrieved from a plan cache (e.g., the plan cache 192). In general, the query execution plan for the incoming query statement (e.g., the query 112) can be different from the query execution plan for the incoming query statement appended with a hint (e.g., the query 114) because the hint can provide additional information or instructions to the query optimizer.

Then, at 260, the query execution plan can be executed (e.g., by the query executor 170).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4

Example Wildcard Expressions in Patterned Query Statements with Hints

As described above, target query statements stored in the hint registry can be patterned or non-patterned. As described herein, a patterned query statement includes a wildcard expression, whereas a non-patterned query statement is absent of a wildcard. A wildcard expression can be a special character or sequence of characters that matches any character or set of characters in a string. In the examples described hereinafter, a special syntax is used, by which a wildcard expression is enclosed within two pairs of double dollar signs ($$). It is to be understood that such syntax is merely one example implementation, and the wildcard expression can be denoted by other tokens.

A typical SQL query for data retrieval is the SELECT statement, which includes a FROM clause and a WHERE clause. The FROM clause specifies the table or tables from which the data will be retrieved, e.g., by specifying the table name or names. The WHERE clause is used to filter the data returned by the query based on specified conditions, e.g., by specifying criteria or expressions that must be satisfied for a row to be included in the query result. As described herein, for a patterned SELECT statement, the wildcard expression can appear in the WHERE clause, the FROM clause, or both the WHERE and FROM clauses.

In one example, the wildcard expression can include a predefined symbol that matches any constants or literals represented by one or more characters of a query. For example, when doing string comparison between a patterned query statement and a query, the wildcard expression $$?$$ in the patterned query statement can match any literals (e.g., 1234, 1234.123, 123E10, 'abc,' 'ab'c,' etc.) appearing in corresponding position of the query. In this example, the predefined symbol used in the wildcard expression is a question mark "?". In other examples, other symbols can be used (e.g., an asterisk mark "*", etc.).

In another example, the wildcard expression can include a set of constants. When doing string comparison between a patterned query statement and a query, a literal (represented by one or more characters) appearing in a corresponding position of the query can be matched to the wildcard expression if the literal in the query is identical to any constant in the set. For example, the wildcard expression $${0, 1, 2}$$ defines a set of three constants 0, 1, and 2. This wildcard expression can be matched to 0, 1, or 2 appearing in a corresponding position of the query. In this example, curly brackets are used define a set of constants in the wildcard expression. In other examples, other symbols can be used denote a set of constants.

In another example, the wildcard expression can include a range defined by a minimum value (min) and a maximum value (max). When doing string comparison between a patterned query statement and a query, a literal (represented by one or more characters) appearing in a corresponding position of the query can be matched to the wildcard expression if the literal in the query is within the range defined by the wildcard expression. For example, the wildcard expression $$(0, 10)$$ defines a range between 0 and 10. This wildcard expression can match any literals within the range (0, 10) and appearing in a corresponding position of the query. As described herein, the range defined in a wildcard expression can be an open range (e.g., enclosed within two parentheses, or (min, max)), or a closed range (e.g., enclosed within two square brackets, or [min, max]), or a half-bounded range (e.g., enclosed within a parenthesis and a square bracket, or [min, max) or (min, max]). Other notations can be used to define the range in a wildcard expression.

In yet another example, the wildcard expression can include a partial string combined with a wildcard template. In some examples, the wildcard template can be enclosed within a pair of curly brackets { }. In other examples, the wildcard template can be denoted by other tokens. In some examples, the wildcard template can include a symbol (e.g., a question mark "?") which can match any literals. For instance, a wildcard expression $$TEMP_ {?}$$ defines a partial string "TEMP_" and the wildcard template "?". This wildcard expression can match any literals that start with the string "TEMP_" (e.g., TEMP_01234, TEMP_12412, TEMP_A01Z, etc.) and appear in a corresponding position of the query. In some examples, the wildcard template can include a predefined datatype which can match any literals having such datatype. Example datatypes include NUMBER, DATE, TIME, TIMESTAMP, or other datatypes that are supported by the database system. For instance, a wildcard expression $$TAB {DATE}$$ defines a partial string "TAB" and the wildcard template DATE. This wildcard expression can match any literals that start with the string "TAB" and followed with a date (e.g., TAB2023-06-10, TAB05JUL2022, etc.). In some examples, the wildcard template can include a set of constants or a range, similar to the examples described above.

Example 5

Example Hint Registry

FIG. 3 depicts an example hint registry 300, which includes a plurality of entries or hint records (e.g., 310-380). In the depicted example, each hint record in the hint registry 300 includes a pair of a target query statement and a corresponding hint.

In some examples, the hint for the paired target query statement can be enabled (E) or disabled (D), e.g., according to a Boolean flag associated with the hint record. As described herein, when a hint paired with a target query statement is disabled, the hint is prevented from being appended to an incoming query (e.g., the incoming query 112 in FIG. 1) even if the incoming query matches the target query statement stored in the hint registry. Conversely, when a hint paired with a target query statement is enabled, the hint is allowed to be appended to the incoming query if the incoming query matches the target query statement stored in the hint registry.

As described above, the target query statements in the hint registry 300 can be patterned (i.e., including a wildcard expression) or non-patterned (i.e., without a wildcard expression). In the depicted example, the target query statement in the hint record 320 is non-patterned, whereas the target query statements in other hint records are patterned. As shown, wildcard expressions are included in the WHERE clauses of target query statements in hint records 310, 330, 340, 360, 370, and 380. Additionally, wildcard expression are also included in the FROM clauses of target query statements in hint records 350, 360, 370, and 380.

As described above, if an incoming query matches one of the target query statements in the hint registry 300, the hint paired with that target query statement can be appended to the incoming query (assuming the hint is enabled). For example, hint record 360 includes a wildcard expression $$TEMP_ {?}$$ in the FROM clause and another wildcard expression $${1, 2, 3}$$ in the WHERE clause of the SELECT statement. Thus, any of the following incoming queries will be found to match the target query statement in hint record 360:

Select*from TEMP_01234 where a=1
Select*from TEMP_12412 where a=2
Select*from TEMP_A10Z where a=3

As a result, hint6 will be appended to each of those incoming queries.

Example 6

Example Priority Management for Hints Paired with Target Query Statements

In some examples, an incoming query (e.g., the incoming query 112 in FIG. 1) may be found to match two or more target query statements in the hint registry. In such circumstances, non-patterned query statements can have a higher priority or precedence than patterned query statements, that is, hints paired with the non-patterned query statements are appended to the incoming query. Such priority management assumes that hints paired with non-patterned query statements are more specific and desired by the user. For example, assuming an incoming query is: Select*from t1 where a=1234. This incoming query can be found to match both the patterned query statement in hint record 310 and the non-patterned query statement in hint record 320. Thus, hint2 (rather than hint1) will be appended to the incoming query.

In cases where an incoming query matches two different patterned query statements in the hint registry, hint enablement/disablement and/or predefined rules can be used to select which hint should be appended to the incoming query. For example, assuming an incoming query is: Select*from TEMP_0152 where a=2. This incoming query can be found to match both the patterned query statement in hint record 360 and the patterned query statement in hint record 380. In the depicted example, hint6 (in hint record 360) is enabled whereas hint8 (in hint record 380) is disabled. Thus, hint6 will be appended to the incoming query. If hint8 is also enabled, hint6 can still be appended to the incoming query according to a predefined rule which selects the hint associated with the first patterned query statement that matches the incoming query. Or, both hint6 and hint8 can be appended to the incoming query, that is, the two hints can be merged.

Example 7

Example Actions on Hints

Figure 4:
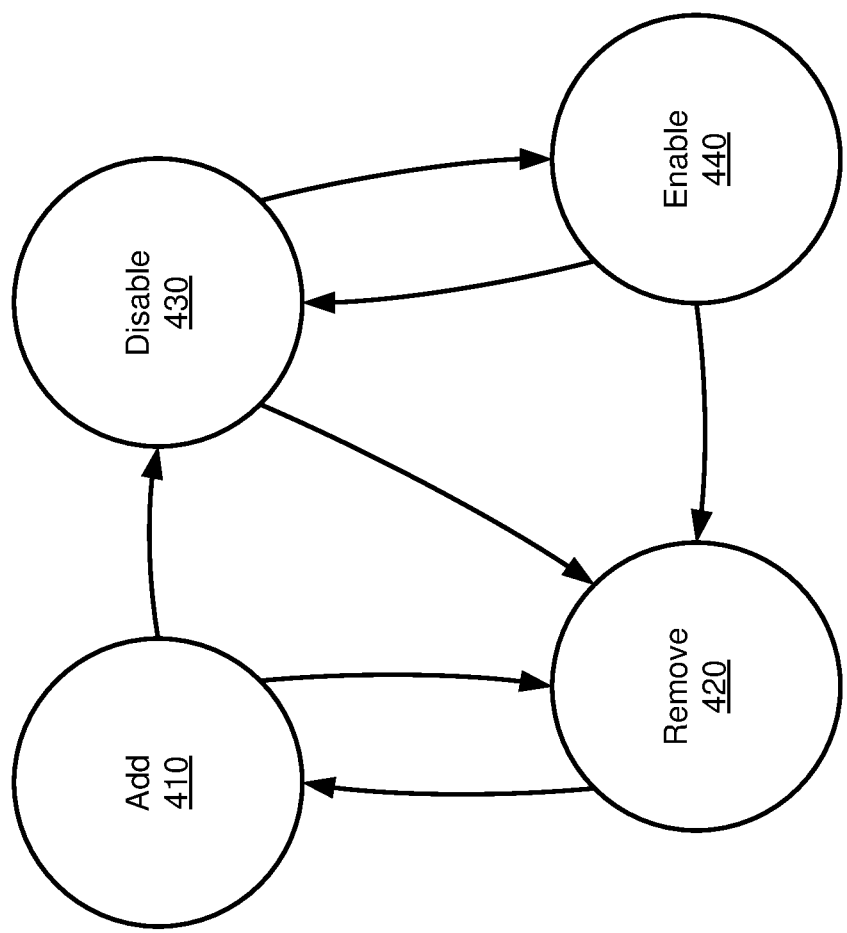
FIG. 4 is a diagram illustrating different actions that can be applied to hints paired with query statements.

FIG. 4 depicts actions that can be applied to hints paired with target query statements, and state transitions between those actions. Example actions include adding (or registering) a hint to the hint registry 410, removing a hint from the hint registry 420, disabling a hint in the hint registry 430, and enabling a hint in the hint registry 440. These actions can be handled or performed by a hint manager (e.g., the hint manager 180).

In FIG. 4, the arrows indicate some possible sequences of these actions. For example, after a hint is added to the hint registry, the hint can be removed or disabled. A disabled hint can be enabled or removed from the hint registry. An enabled hint can be disabled or removed from the hint registry. A removed hint can be added back to the hint registry.

In some examples, a user can provide a hint command to register a query statement and a paired hint in the hint registry. The hint command can specify a particular hint to be appended to a target query statement, which can be patterned or non-patterned. For example, a user can use the following "alter system add statement hint" command to register a new hint record in the hint registry:

alter system add statement hint (no_use_hex_plan) for select*from t1 where a=$$?$$

Specifically, this hint command can cause the hint manager to add a patterned query "select*from t1 where a=$$?$$" and a paired hint "no_use_hex_plan" to the hint registry. By default, the newly added hint in the hint registry can be automatically enabled.

In some examples, a user can provide a hint command to remove a hint record (including a target query statement and the paired hint) from the hint registry. For example, a user can use the following "alter system remove statement hint" command:

alter system remove statement hint for select*from t1 where a=$$?$$

This hint command can remove the hint that is paired with the target query statement "select*from t1 where a=$$?$$" from the hint registry. In some implementations, the hint manager may allow two or more hint records having the same target query statement but with different hints, e.g., by enabling one of the hints while disabling the other hints. In such case, the above hint command can remove all hints paired with the target query statement "select*from t1 where a=$$?$$" from the hint registry.

In some examples, a user can provide a hint command to disable a hint paired with a target query statement in the hint registry. For example, a user can use the following "alter system disable statement hint" command:

alter system disable statement hint for select*from t1 where a=$$?$$

This hint command can disable the hint that is paired with the target query statement "select*from t1 where a=$$?$$" in the hint registry. In cases that the hint manager allows two or more hint records having the same target query statement but with different hints, the above hint command can disable all hints paired with the target query statement "select*from t1 where a=$$?$$" in the hint registry.

In some examples, a user can provide a hint command to enable a hint paired with a target query statement in the hint registry. For example, a user can use the following "alter system enable statement hint" command:

alter system enable statement hint for select*from t1 where a=$$?$$

This hint command can enable the hint that is paired with the target query statement "select*from t1 where a=$$?$$" in the hint registry.

Example 8

Example Usage of Patterned Query Statements with Hints

Figure 6:
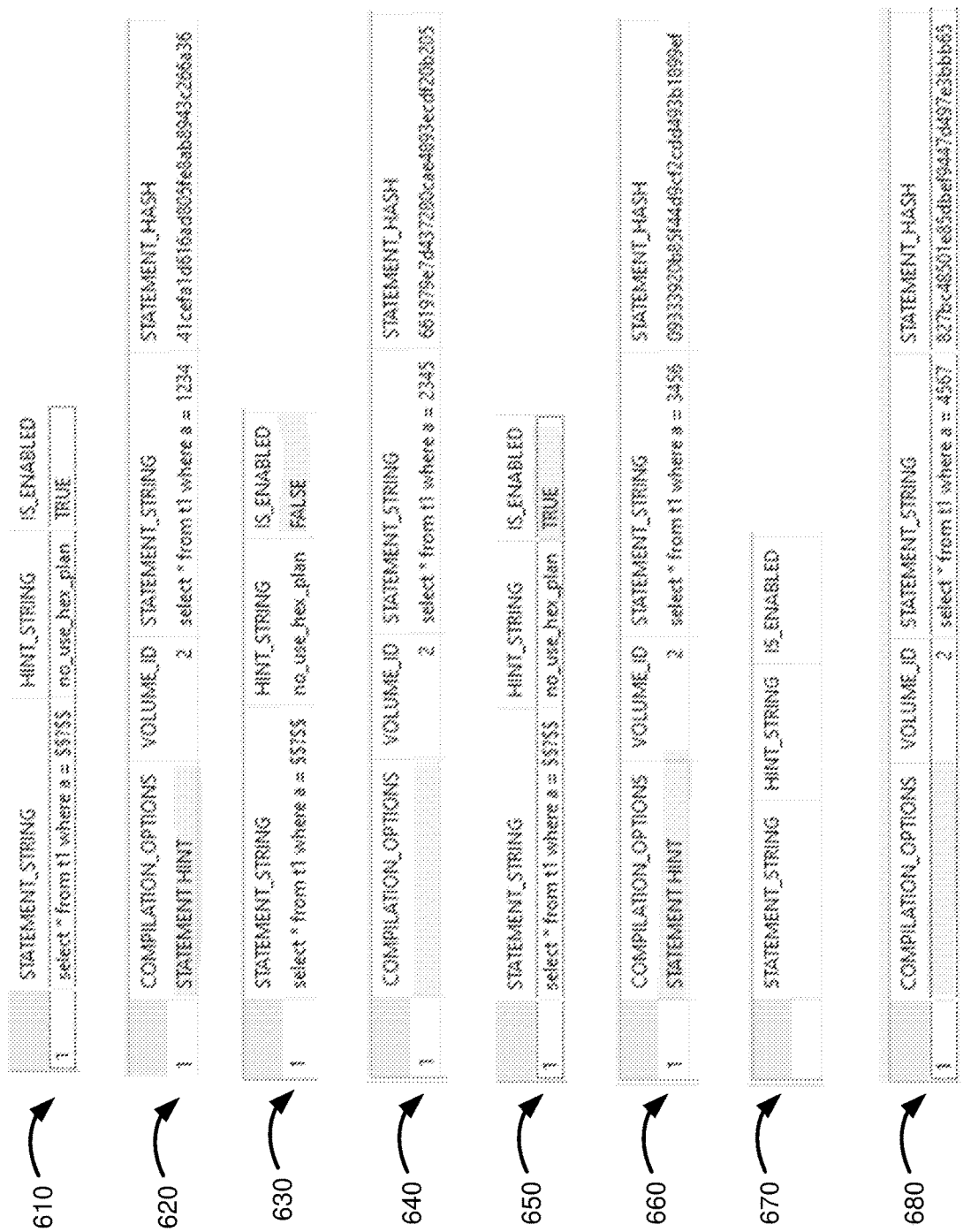
FIG. 6 depicts the effects of the query commands of FIG. 5.

For illustration purposes, FIG. 5 depicts some example query commands involving patterned query statements with hints, and FIG. 6 depicts the effects of these query commands by presenting some internal results as the hint manager processes the patterned query statements with hints.

In a first group of query commands 510, a table named t1 is dropped and then re-created. Then an "alter system add statement hint" hint command is used to add a hint "no_use_hex_plan" to a patterned query statement "select*from t1 where a=$$?$$." The next SELECT statement checks if the hint is added to the hint registry. The result of this SELECT statement is shown in table 610 of FIG. 6, which lists the new hint record added to the hint registry, which includes the patterned query statement "select*from t1 where a=$$?$$" and the paired hint "no_use_hex plan." Also, this newly added hint is automatically enabled (IS_ENABLED=TRUE), as described above.

In a second group of query commands 520, an incoming query "select*from t1 where a=1234" is received and processed. The next SELECT statement checks if any compilation options are applied to the incoming query. The result is shown in table 620 of FIG. 6, which confirms that a hint is appended to the incoming query. In this example, the hint would be "no_use_hex plan" because the incoming query matches the patterned query statement "select*from t1 where a=$$?$$" stored in the hint registry.

In a third group of query commands 530, an "alter system disable statement hint" hint command is used to disable the hint paired with the patterned query statement "select*from t1 where a=$$?$$." The next SELECT statement checks if the hint is disabled. As shown in table 630 of FIG. 6, the hint "no_use_hex_plan" paired with the patterned query statement "select*from t1 where a=$$?$$" is indeed disabled (IS_ENABLED=FALSE).

In a fourth group of query commands 540, another incoming query "select*from t1 where a=2345" is received and processed. The next SELECT statement checks if any compilation options are applied to the incoming query. The result is shown in table 640 of FIG. 6, which shows that no hint is appended to the incoming query (e.g., the column of COMPILATION_OPTIONS is empty). This is because the hint paired with the patterned query statement "select*from t1 where a=$$?$$" is disabled, even though the incoming query "select*from t1 where a=2345" matches the patterned query statement.

In a fifth group of query commands 550, an "alter system enable statement hint" hint command is used to enable the hint paired with the patterned query statement "select*from t1 where a=$$?$$." The next SELECT statement checks if the hint is enabled. As shown in table 650 of FIG. 6, the hint "no_use_hex plan" paired with the patterned query statement "select*from t1 where a=$$?$$" is indeed enabled (IS_ENABLED=TRUE).

In a sixth group of query commands 560, another incoming query "select*from t1 where a=3456" is received and processed. The next SELECT statement checks if any compilation options are applied to the incoming query. The result is shown in table 660 of FIG. 6, which confirms that a hint is appended to the incoming query. In this example, the hint would be "no_use_hex plan" because the incoming query matches the patterned query statement "select*from t1 where a=$$?$$" stored in the hint registry.

In a seventh group of query commands 570, an "alter system remove statement hint" hint command is used to remove the hint paired with the patterned query statement "select*from t1 where a=$$?$$" from the hint registry. The next SELECT statement checks if the hint is removed. As shown in table 670 of FIG. 6, the hint "no_use_hex plan" paired with the patterned query statement "select*from t1 where a=$$?$$" is indeed removed from the hint registry.

In an eighth group of query commands 580, another incoming query "select*from t1 where a=4567" is received and processed. The next SELECT statement checks if any compilation options are applied to the incoming query. The result is shown in table 680 of FIG. 6, which shows that no hint is appended to the incoming query (e.g., the column of COMPILATION_OPTIONS is empty). This is because the hint paired with the patterned query statement "select*from t1 where a=$$?$$" was removed from the hint registry. As a result, no query statement in the hint registry is found to match the incoming query, and the incoming query is thus not modified by any hint.

Example 9

Example Plan Cache Management

As described above, a cache manager (e.g., the cache manager 140) can be configured to manage a plan cache (e.g., the plan cache 192) so that query plans that are more likely to be reused are kept in the plan cache while other less-likely-used query plans can be evicted from the plan cache. Management of plan cache can be more complicated when hints are allowed to modify incoming queries. This is because a query plan generated for an incoming query without a hint is usually different from a query plan generated for the same incoming query that is modified by a hint.

As described herein, different hint commands (e.g., adding a hint, removing a hint,
enabling a hint, disabling a hint) can impact the decision making about which query plan should be saved in the plan cache and which query plan in the plan cache should be evicted.

In certain examples, after registering a target query statement and a paired hint in the hint registry (e.g., by using the "alter system add statement hint" command), a query plan in the plan cache that was previously compiled based on the target query statement (without the hint) can be evicted from the plan cache. For example, after registering a non-patterned query statement "select*from t1 where a=1234" and a paired hint in the hint registry, a query plan in the plan cache that was previously compiled based on the same query statement "select*from t1 where a=1234" (without the hint) can be evicted. This is because if the incoming query is the same query statement "select*from t1 where a=1234," it will now be appended with a hint, and this modified query cannot reuse the query plan in the plan cache that corresponds to the same query statement without the hint.

As another example, after registering a patterned query statement "select*from t1 where a=$$?$$" and a paired hint in the hint registry, a query plan in the plan cache that was previously compiled based on a query statement (without the hint) that matches the patterned query statement can be evicted. If there are multiple query plans in the plan cache that were compiled based on different query statements (without the hint) matching the patterned query statement, one of them can be selected for eviction. The selection among these multiple query plans can be manually made by the user, or automatically by an eviction algorithm (e.g., selecting randomly, selecting the least recently used, selecting the least frequently used, etc.).

In certain examples, after removing a target query statement and a paired hint in the hint registry (e.g., by using the "alter system remove statement hint" command), a query plan in the plan cache that was previously compiled based on the target query statement appended with the hint can be evicted from the plan cache. For example, after removing a non-patterned query statement "select*from t1 where a=2345" and a paired hint from the hint registry, a query plan in the plan cache that was previously compiled based on the same query statement "select*from t1 where a=2345" appended with the hint can be evicted. This is because if the incoming query is the same query statement "select*from t1 where a=2345," it will be now processed as it is (without a hint), and this query cannot reuse the query plan in the plan cache that corresponds to the same query statement appended with the hint.

As another example, after removing a patterned query statement "select*from t1 where a=$$?$$" and a paired hint from the hint registry, a query plan in the plan cache that was previously compiled based on a query statement that matches the patterned query statement (and appended with the hint) can be evicted. If there are multiple query plans in the plan cache that were compiled based on different query statements matching the patterned query statement (and appended with the hint), one of them can be selected for eviction. The selection among these multiple query plans can be manually made by the user, or automatically by an eviction algorithm (e.g., selecting randomly, selecting the least recently used, selecting the least frequently used, etc.).

In certain examples, if a hint paired with a target query statement in the hint registry is switched from the disabled status to the enabled status (e.g., by using the "alter system enable statement hint" command), a query plan in the plan cache that was previously compiled based on the target query statement (without the hint) can be evicted from the plan cache, similar to the steps taken after registering the query statement and the paired hint in the hint registry.

In certain examples, if a hint paired with a target query statement in the hint registry is switched from the enabled status to the disabled status (e.g., by using the "alter system disable statement hint" command), a query plan in the plan cache that was previously compiled based on the target query statement appended with the hint can be evicted from the plan cache, similar to the steps taken after removing the query statement and the paired hint from the hint registry.

On the other hand, if a hint paired with a target query statement in the hint registry is already disabled before removing the hint and the target query statement from the hint registry, then such removal may not cause eviction of any query plan from the plan cache. This is because a query plan in the plan cache that was previously compiled is based on the target query statement without the hint (since the hint was disabled). Thus, after removing the hint and the paired target query statement from the hint registry, an incoming query that matches the target query statement will still be processed without the hint, thus can reuse the same query plan in the plan cache.

Example 10

Example Database Objects as Hint Targets

As described above, hint targets included in hint records of a hint registry not only can be target query statements, but also can be target objects. When a hint target is a target object, the hint paired to the target object can be appended to any incoming queries in which the target object is specified. As described herein, the target objects can include database tables, database views, table functions, synonyms, sequences, etc.

Figure 7:
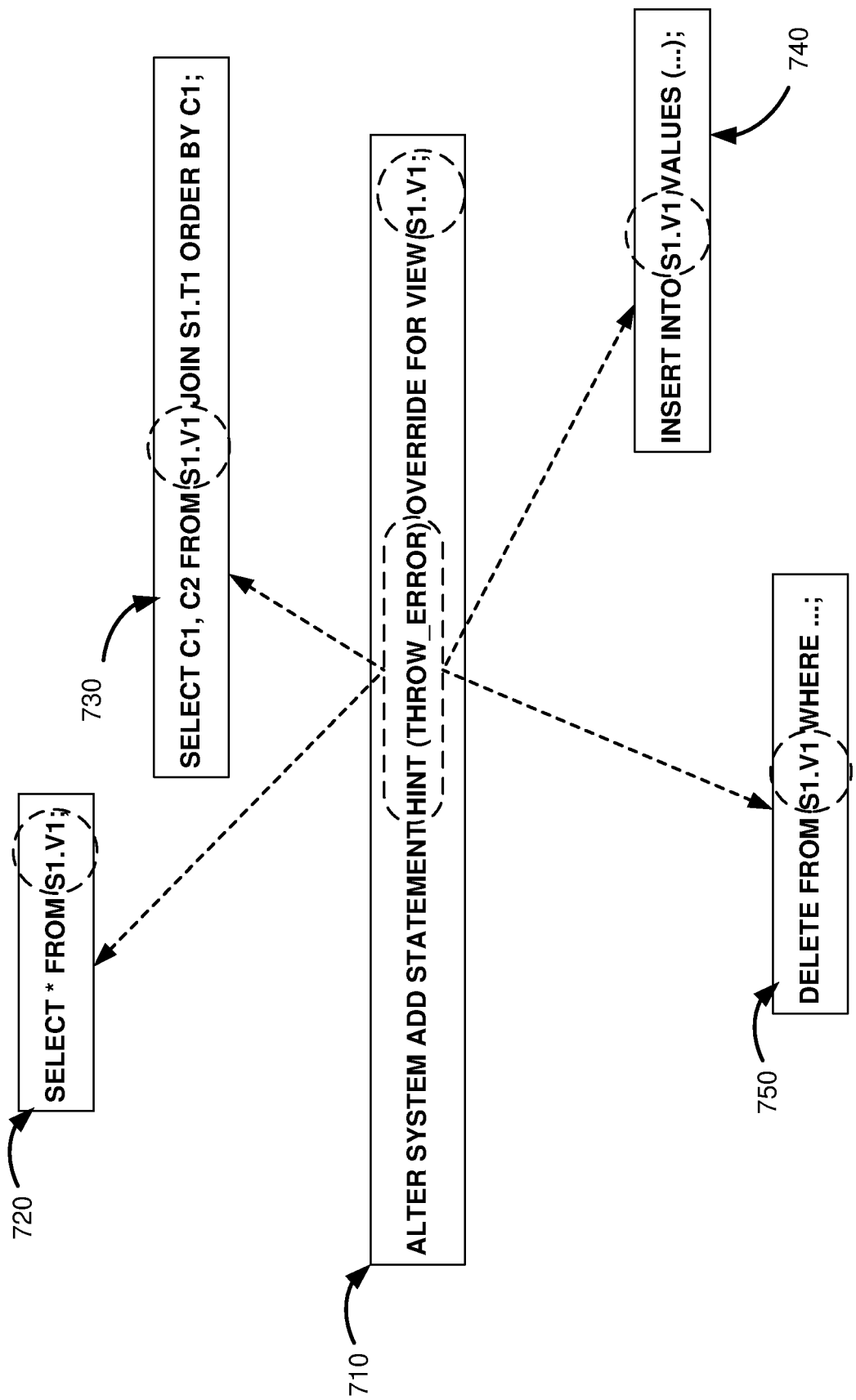
FIG. 7 depicts an example query command configured to add a hint to multiple queries involving a specific database object.

For illustration purposes, FIG. 7 depicts an example ALTER SYSTEM ADD STATEMENT HINT query command 710 configured to add a hint record comprising a target object and a paired hint to a hint registry. In this example, the target object is S1.V1 (e.g., a database view named V1 in schema S1; in some examples, the schema name S1 may be omitted if the schema is predetermined), and the corresponding hint paired to S1. V1 is "THROW_ERROR." Once registered, any incoming queries that specify the target object S1.V1 will be appended with the hint "THROW_ERROR."

For example, FIG. 7 shows four example incoming queries 720, 730, 740, and 750, each of which includes the target object S1.V1. As such, when processed by a hint manager (e.g., the hint manager 180), the hint "THROW_ERROR" will be appended to each of the incoming queries 720, 730, 740, and 750 for downstream query processing. Thus, if the database system crashes when processing queries accessing the view S1. V1, by registering a hint record in the hint registry that includes the target object S1.V1 and the pairing hint "THROW_ERROR," any incoming queries that access the view S1. V1 will cause the database system to throw an error (due to the appended hint) and prevent system crash.

The query command 710 depicted in this example follows the following syntax:
ALTER SYSTEM ADD STATEMENT HINT (<hints>)
    <opt_override> FOR <hint_target>

Here, <hints> can include one single hint (e.g., "THROW_ERROR") or multiple hints. The parameter <opt_override>, which is optional, can be "OVERRIDE" or "MERGE." When omitted, the parameter can be assigned a default value (e.g., "MERGE"). This parameter can control whether the hint specified in the <hints> should be merged with or replace the hint explicitly specified in an incoming query, as described further below. The <hint_target> can include one or more hint targets. It should be understood that the syntax of the command query 710 is merely exemplary and can be modified in different ways so long as the syntax can be understood by the underlying database system.

In the example depicted in FIG. 7, only one database object (S1.V1) is specified by the query command 710. In other examples, the <hint_target> can be a list including multiple hint targets. For example, the <hint_target> can be (S1.V1, S1.T1) which represents two target objects: a database view S1.V1 and a database table S1.T1. In this scenario, any incoming queries that specify both S1.V1 and S1.T1 will be appended with the hint specified in <hints> (e.g., "THROW_ERROR"). In other words, if multiple target objects are specified in <hint_target>, it can represent a conjunction (logical AND) relationship where the <hints> is appended to an incoming query if the incoming query includes (thus requires access to) all target objects specified in <hint_target>.

In some examples, the <hint_target> can specify multiple hint targets that are in a disjunction (logical OR) relationship. For example, the <hint_target> can be defined as:
S1.V1|select*from T1 where a=100|select*from T2
    where b=$$(0,10)$$

In this example, the <hint_target> includes three hint targets that are in disjunctive relationship (denoted by the OR operator "|"): one target object (S1.V1), one non-patterned query statement (select*from T1 where a=100), and one patterned query statement (select*from T2 where b=$$(0,10)$$). In this example, an incoming query will be appended with the hint specified in <hints> if the incoming query specifies the target object (S1.V1), or matches the non-patterned query statement, or matches the patterned query statement.

Although FIG. 7 only depicts an example query command to add a hint record comprising a target object and a paired hint to the hint registry, other query commands can be used to remove, enable, or disable a hint record comprising a target object and a paired hint, similar to the examples described above with reference to FIGS. 4-6.

Example 11

Example Method of Handling Hints Paired with Target Objects

Figure 8:
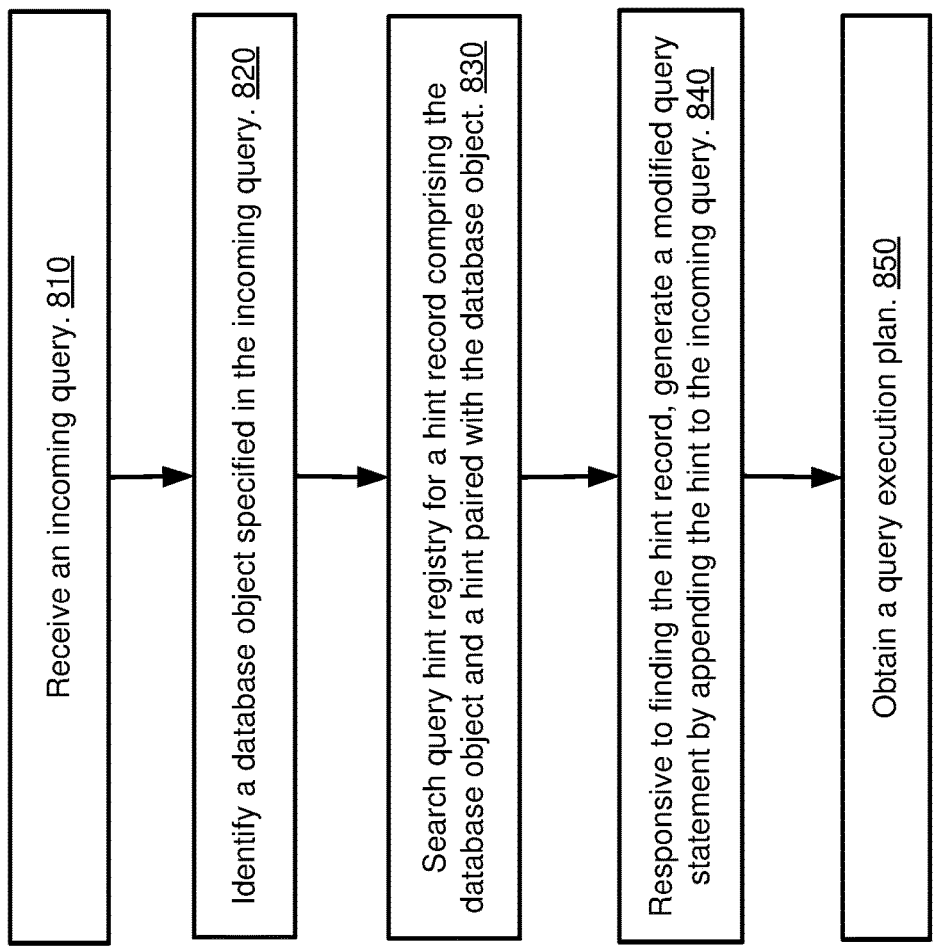
FIG. 8 depicts an example method for handling hints paired with target objects.

FIG. 8 is a flowchart illustrating an example overall method 800 of processing queries including target objects with paired hints.

At 810, an incoming query statement (e.g., the incoming query 112) can be received, e.g., by a hint manager (e.g., the hint manager 180).

At 820, the incoming query statement can be parsed (e.g., by the hint manager 180) to identify a database object specified in the incoming query statement. The database object can appear in any part of the incoming query statement. For example, if the incoming query statement is a SELECT statement, the database objects can be in the FROM clause or in the WHERE clause.

At 830, a query hint registry (e.g., the hint registry 198) can be searched (e.g., by the hint manager 180) to identify a hint record comprising the database object (i.e., the target object) and a hint paired with the database object.

At 840, responsive to finding such a hint record in the hint registry, a modified query statement can be generated (e.g., by the hint manager 180) by appending the hint included in the hint record to the incoming query statement.

At 850, a query execution plan can be obtained for the modified query statement. For example, the query execution plan can be generated by a query optimizer (e.g., if the modified query statement has not been processed before) or retrieved from a plan cache (e.g., if the modified query statement was previously compiled and saved in the plan cache). Then, the query execution plan can be executed (e.g., by the query executor 170).

The method 800 can also be extended to handle situations where the incoming query statement includes multiple database objects. For example, if the incoming query statement includes two database objects O1 and O2, the hint manager can search the hint registry for a first hint record (R1) that includes the target object O1 (e.g., paired with a hint H1), a second hint record (R2) that includes the target object O2 (e.g., paired with a hint H2), and a third hint record (R3) that includes both target objects O1 and O2 (e.g., paired with a hint H3). If any of the above hint records are found, the hints in respective hint records can be appended to the incoming query. When two or more hints are appended to the incoming query, these hints are merged (or combined) so that the modified query statement includes multiple hints. Thus, depending on the search result, the incoming query may not be appended with any hint (e.g., none of R1, R2, and R3 is found), or appended with a single hint H1 (e.g., only R1 is found), or appended with a single hint H2 (e.g., only R2 is found), or appended with two hints H1 and H2 (e.g., only R1 and R2 are found), or appended with all three hints H1, H2, and H3 (e.g., R1, R2, and R3 are all found). Similar principle can apply when the incoming query statement includes three or more objects.

Example 12

Figure 9:
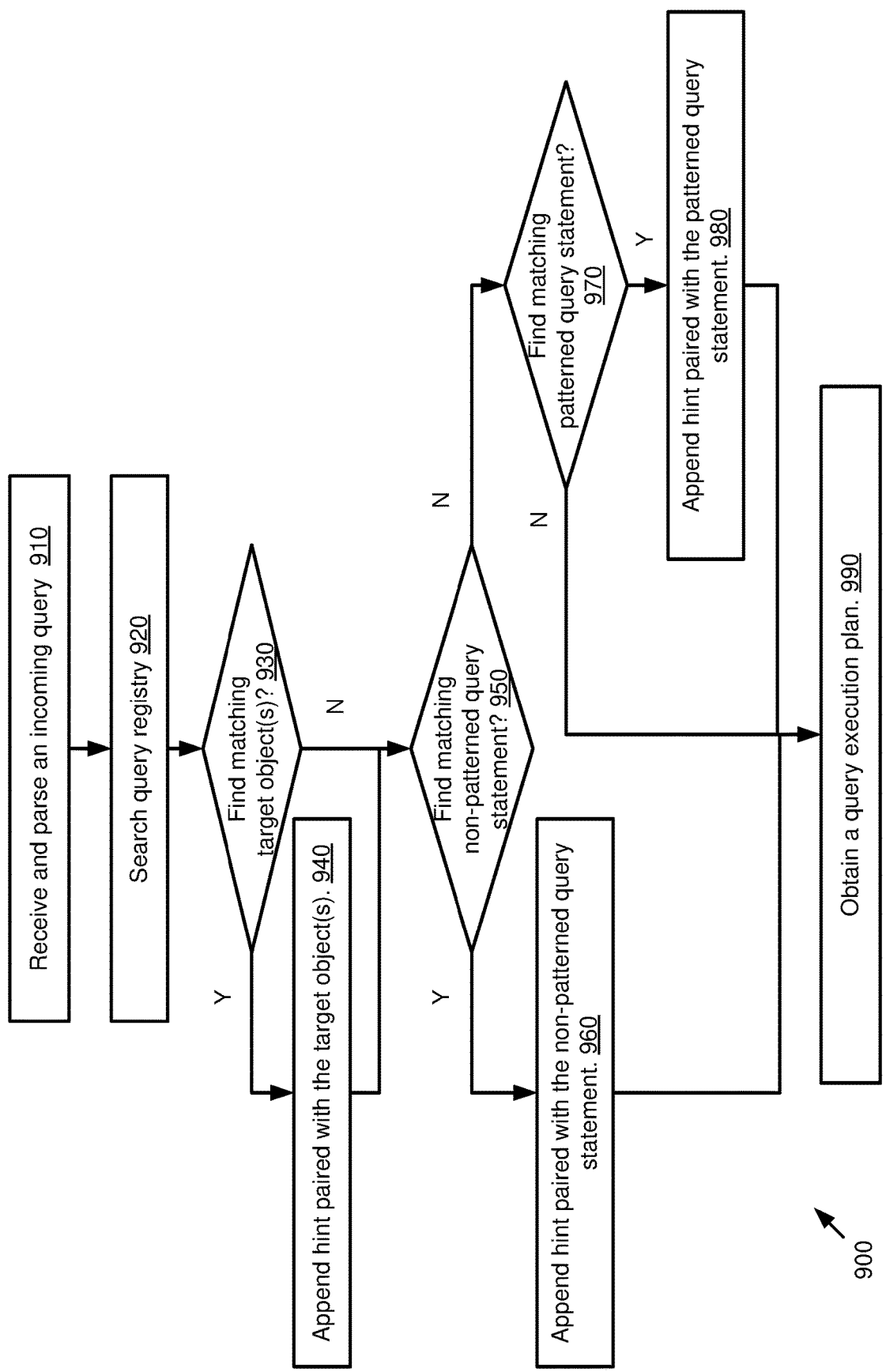
FIG. 9 depicts an example method for managing hint precedent.

Example Priority Management for Hints Paired with Different Types of Hint Targets FIG. 9 is a flowchart illustrating an example method 900 of managing precedents for hints paired with different types of hint targets.

At 910, an incoming query can be received, e.g., by a hint manager (e.g., the hint manager 180). The incoming query can be parsed to identify database objects specified therein, as described above.

At 920, a hint registry can be searched to find all hint records with hint targets that can be matched to the incoming query. A hint target can match the incoming query if the hint target specifies one or more target objects that appear in the incoming query, or if the hint target is a target query statement (patterned or non-patterned) that matches the incoming query.

At 930, a condition check can be performed to determine whether a hint record including one or more target objects that are matched to the incoming query. If no, the method can move to another condition check at 950. Otherwise, the method can move to 940, where a hint paired with the one or more target objects can be appended to the incoming query. Then, the method can move to the condition check at 950.

At 950, it is determined whether a hint record including a non-patterned query statement matches the incoming query. If yes, the method can move to 960, where a hint paired with the non-patterned query statement can be appended to the incoming query. Then the method can move to step 990, where a query execution plan can be obtained (e.g., compiled or retrieved from a plan cache, as described above).

If the condition check at 950 returns no, the method can perform another condition check at 970 to determine whether a hint record including a patterned query statement matches in the incoming query. If yes, the method can move to 980, where a hint paired with the patterned query statement can be appended to the incoming query, and then proceed to step 990. If the condition check at 970 returns no, the method can move directly to step 990.

Thus, depending on condition check results at 930, 950, and 970, the query execution plan obtained at step 990 can correspond to the original incoming query received at 910, or the incoming query modified by one or more hints appended at 940, 960, and/or 980. For example, if the condition checks at 930, 950, and 970 all return no, no hint is appended to the incoming query. On the other hand, if the condition checks return no at 940 and 960 but returns yes at 970, then a hint will be appended to the incoming query at 980. As another example, if the condition checks return no at 960 and 970 but returns yes at 930, then a hint will be appended to the incoming query at 940. As a further example, if the condition checks at 930 and 970 both return yes but the condition check at 950 returns no, two hints will be appended to the incoming query at 940 and 980, respectively. Similarly, if the condition checks at 930 and 950 both return yes, two hints will be appended to the incoming query at 940 and 960, respectively. As described above, when two or more hints are appended to the incoming query (e.g., one hint is appended at 940, and another hint is appended at 960 or 970), these hints can be merged (or combined) so that the modified query statement includes multiple hints.

Notably, a hint can be added at 960 or 980, but not both. This is in accordance with the priority rule described above, that is, a non-patterned query statement has a higher priority than a patterned query statement. Thus, if the incoming query matches both a patterned query statement (e.g., the condition check at 970 returns yes) and a non-patterned query statement (e.g., the condition check at 950 returns yes), only the hint paired with the non-patterned query statement is appended to the incoming query (at 960).

Additionally, the method 900 shows that a hint paired with target object(s) has the highest priority. For example, if the condition check at 930 returns yes, a hint paired with the target object(s) will always be appended to the incoming query (at 940), regardless of the condition check results at 950 and 970.

Example 13

Example Hint Override and Merge

In some examples, when registering a hint record in a hint registry (e.g., by using the ALTER SYSTEM ADD STATEMENT HINT query command), an optional control parameter can be specified to determine whether a hint included in the hint record should be merged with or replace a hint explicitly specified in an incoming query. In unspecified, the control parameter can be assumed to be set by default (e.g., MERGE, or alternatively, OVERRIDE). This parameter control feature can be applied to all hint records, no matter the hint targets in the hint records are target objects or target query statements.

Figure 10:
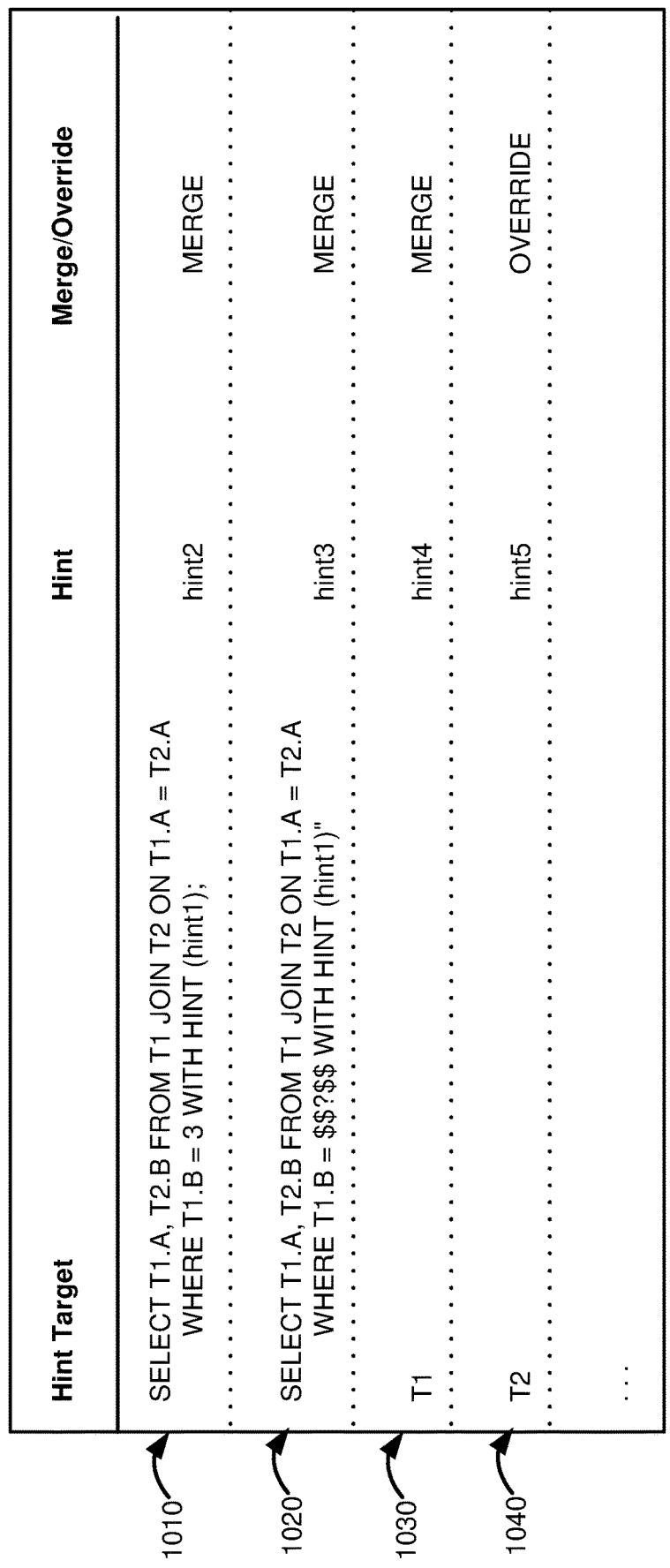
FIG. 10 depicts some example hint records stored in a hint registry.

To further illustrate, FIG. 10 depicts several hint records (e.g., 1010, 1020, 1030, 1040, etc.) in a hint registry 1000. Each hint record includes a hint target and a hint paired with the corresponding hint target. Additionally, each hint record is associated with a specified control parameter which can be either MERGE or OVERRIDE. Although not shown, each hint record can also have a Boolean flag indicating the corresponding hint is enabled or disabled, as described above.

The hint records shown in FIG. 10 can be registered in the hint registry 1000 by using a specific query command, e.g., the ALTER SYSTEM ADD STATEMENT HINT query command in SAP HANA with the following syntax:
    ALTER SYSTEM ADD STATEMENT HINT (<hints>)
        <override/merge> FOR <hint_target>

To register hint records 1010, 1020, 1030, and 1040, the <hints> can be set to hint 2, hint3, hint4, and hint5, respectively. The <opt_override> can be set to MERGE for hint records 1010, 1020, and 1030, and OVERRIDE for hint record 1040. The <hint_target> can be set to a non-patterned query statement for hint record 1010, a patterned query statement for hint record 1020, a target object T1 for hint record 1030, and a target object T2 for hint record 1040, as shown in FIG. 10.

Notably, in the depicted example, the target query statement included in hint records 1010 and 1020 both specify an explicit hint, i.e., hint1, because of the WITH HINT (hint1) clause.

Assume an incoming query sent from a tenant user is:
    SELECT T1.A. T2.B FROM T1 JOIN T2 ON T1.A=T2.A
        WHERE T1.B=3 WITH HINT (hint1)

This incoming query will match the hint targets of all four hint records 1010, 1020, 1030, and 1040. This is because the incoming query is identical to the nonpatterned query statement in hint record 1010, is matched to the patterned query statement in hint record 1020, and specifies both target objects T1 (included in hint record 1030) and T2 (included in hint record 1040).

Because the incoming query matches both a patterned query statement (in hint record 1020) and a non-patterned query statement (in hint record 1010), hint2 is appended to the incoming query whereas hint3 will not be appended to the incoming query, according the priority rule described above. Additionally, because the incoming query includes both T1 and T2, hint4 and hint5 are also appended to the incoming query. On the other hand, hint1, which is explicitly specified in the incoming query, will be removed because the control parameter associated with hint5 is OVERRIDE. In other words, hint5 will override or replace hint1. Thus, in this example, the incoming query will be appended with three hints: hint2, hint4, and hint5. In other words, these three hints will be merged so that the modified query statement includes hint 2, hint4, and hint5.

Example 14

Example Advantages

A number of advantages can be achieved via the technologies described herein.

As described above, hints can be helpful in query optimization by providing additional information or instructions to the query optimizer. However, conventional technologies only allow users can add hints to literal queries or queries having specified objects individually. As such, it would be impossible to apply a hint to many literal queries since the literal part of the literal queries can change from query to query. Further, the hint feature could not be used for queries containing temporary objects, which can be created in runtime and whose names can vary during each run. The technologies described herein, for the first time, support patterned query statements with hints. Such an innovative feature allows users to apply hints more efficiently to a bulk of literal queries and/or queries containing temporary objects, thus reducing time and overall costs of query processing, and potentially reducing human errors introduced when entering the hint commands.

Further, the technologies described herein can improve the plan cache management by taking into account user actions on hints. Particularly, users' hint commands (e.g., adding a hint, removing a hint, enabling a hint, disabling a hint, etc.) can trigger selective eviction of query plans in the plan cache that are deemed to be likely incompatible with incoming queries based on compilation options (e.g., with hints or without hints). As a result, the plan cache can be effectively used for both regular queries without hints and queries modified by hints, thus improving the overall performance of query optimization.

Moreover, the technologies described herein allow for the automatic appending of hints to incoming queries involving a specified target object. This can save time and effort in manually finding and adding hints to all relevant queries that may access the target object. It can also help prevent database crashes or other issues that may arise when processing queries (without the necessary hints) that involve a problematic database object. Specifically, by registering a hint paired with a target object in a hint registry, the described solution can ensure that the hint is automatically applied to any incoming queries in which the target object is specified, thereby improving the efficiency and reliability of the database system.

Example 15

Example Computing Systems

Figure 11:
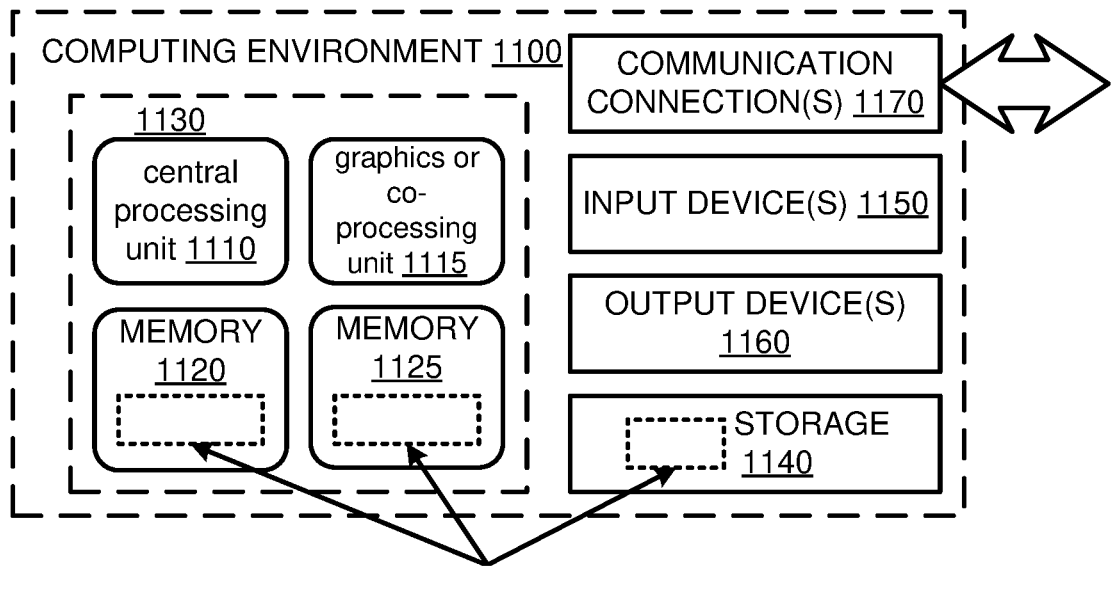
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the methods 200, 800, etc.). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

A computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 can store instructions for the software implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 16

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 17

Example Cloud Computing Environment

Figure 12:
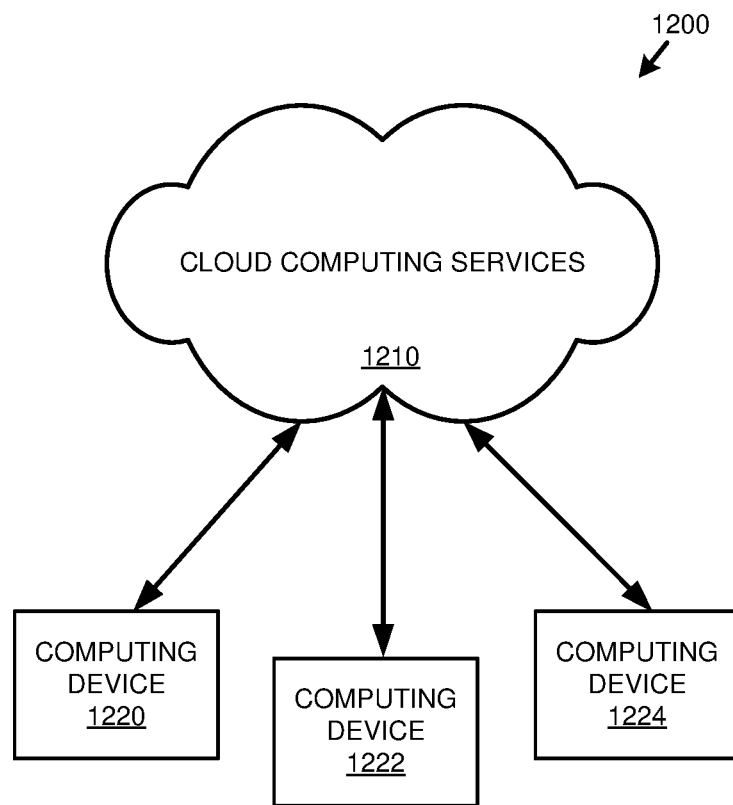
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 and other systems herein. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1223. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 18

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 19

Example Clauses

Any of the following example clauses can be implemented.

Clause 1. A computer-implemented method comprising: receiving an incoming query statement; identifying a database object specified in the incoming query statement; searching a query hint registry for a first hint record which comprises the database object and a first hint paired with the database object; responsive to finding the first hint record in the query hint registry, generating a modified query statement by appending the first hint to the incoming query statement; and obtaining a query execution plan based on the modified query statement.

Clause 2. The method of clause 1, wherein the database object is a database table or a database view.

Clause 3. The method of any one of clauses 1-2, wherein the database object is one of a plurality of database objects specified in the incoming query statement, the method further comprising: searching the query hint registry for a second hint record which comprises the plurality of database objects and a second hint paired with the plurality of database objects; responsive to finding the second hint record in the query hint registry, generating the modified query statement by appending the second hint to the incoming query statement.

Clause 4. The method of clause 3, wherein the modified query statement comprises both the first hint and the second hint.

Clause 5. The method of any one of clauses 1-4, wherein the incoming query statement explicitly specifies a second hint, wherein the first hint replaces the second hint in the modified query statement.

Clause 6. The method of any one of clauses 1-4, wherein the incoming query statement explicitly specifies a second hint, wherein the modified query statement comprises both the first hint and the second hint.

Clause 7. The method of any one of clauses 1-6, further comprising registering a plurality of hint records in the query hint registry, wherein a hint record comprises a hint and a target object paired with the hint, or a hint and a target query statement paired with the hint.

Clause 8. The method of any one of clauses 1-7, further comprising: searching the query hint registry for a second hint record which comprises a target query statement and a second hint paired with the target query statement, wherein the target query statement matches the incoming query statement; responsive to finding the second hint record in the query hint registry, generating the modified query statement by appending the second hint to the incoming query statement, wherein the modified query statement comprises both the first hint and the second hint.

Clause 9. The method of clause 8, wherein the target query statement comprises a wildcard expression which matches one or more characters of the incoming query statement.

Clause 10. The method of any one of clauses 1-9, further comprising executing the query execution plan.

Clause 11. A computing system, comprising: memory; one or more hardware processors coupled to the memory; and one or more computer readable storage media storing instructions that, when loaded into the memory, cause the one or more hardware processors to perform operations comprising: receiving an incoming query statement; identifying a database object specified in the incoming query statement; searching a query hint registry for a first hint record which comprises the database object and a first hint paired with the database object; responsive to finding the first hint record in the query hint registry, generating a modified query statement by appending the first hint to the incoming query statement; and obtaining a query execution plan based on the modified query statement.

Clause 12. The system of clause 11, wherein the database object is a database table or a database view.

Clause 13. The system of any one of clauses 11-12, wherein the database object is one of a plurality of database objects specified in the incoming query statement, wherein the operations further comprise: searching the query hint registry for a second hint record which comprises the plurality of database objects and a second hint paired with the plurality of database objects; responsive to finding the second hint record in the query hint registry, generating the modified query statement by appending the second hint to the incoming query statement.

Clause 14. The system of clause 13, wherein the modified query statement comprises both the first hint and the second hint.

Clause 15. The system of any one of clauses 11-14, wherein the incoming query statement explicitly specifies a second hint, wherein the first hint replaces the second hint in the modified query statement.

Clause 16. The system of any one of clauses 11-14, wherein the incoming query statement explicitly specifies a second hint, wherein the modified query statement comprises both the first hint and the second hint.

Clause 17. The system of any one of clauses 11-16, wherein the query hint registry comprises a plurality of hint records, wherein a hint record comprises a hint and a target object paired with the hint, or a hint and a target query statement paired with the hint.

Clause 18. The system of any one of clauses 11-17, wherein the operations further comprise: searching the query hint registry for a second hint record which comprises a target query statement and a second hint paired with the target query statement, wherein the target query statement matches the incoming query statement; responsive to finding the second hint record in the query hint registry, generating the modified query statement by appending the second hint to the incoming query statement, wherein the modified query statement comprises both the first hint and the second hint.

Clause 19. The system of clause 18, wherein the target query statement comprises a wildcard expression which matches one or more characters of the incoming query statement.

Clause 20. One or more non-transitory computer-readable media having encoded thereon computer-executable instructions causing one or more processors to perform a method comprising: receiving an incoming query statement; identifying a database object specified in the incoming query statement; searching a query hint registry for a first hint record which comprises the database object and a first hint paired with the database object; responsive to finding the first hint record in the query hint registry, generating a modified query statement by appending the first hint to the incoming query statement; obtaining a query execution plan based on the modified query statement; and executing the query execution plan.

Example 20

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
receiving an incoming query statement;
identifying a database object specified in the incoming query statement;
searching a query hint registry for a first hint record which specifies the database object and a first hint paired with the database object, wherein the first hint record is exclusive of any query statement;
responsive to finding the first hint record in the query hint registry, generating a modified query statement by appending the first hint to the incoming query statement; and
obtaining a query execution plan based on the modified query statement,
wherein the incoming query statement specifies an explicit hint, wherein the first hint replaces the explicit hint in the modified query statement.

2. The method of claim 1, wherein the database object is a database table or a database view.

3. The method of claim 1, wherein the database object is one of a plurality of database objects specified in the incoming query statement, the method further comprising:
searching the query hint registry for a second hint record which comprises the plurality of database objects and a second hint paired with the plurality of database objects; responsive to finding the second hint record in the query hint registry, generating the modified query statement by appending the second hint to the incoming query statement.

4. The method of claim 3, wherein the modified query statement comprises both the first hint and the second hint.

5. The method of claim 1, further comprising registering a plurality of hint records in the query hint registry, wherein a hint record comprises (i) a hint and a target object paired with the hint, or (ii) a hint and a target query statement paired with the hint.

6. The method of claim 1, further comprising:
searching the query hint registry for a second hint record which comprises a target query statement and a second hint paired with the target query statement, wherein the target query statement matches the incoming query statement;
responsive to finding the second hint record in the query hint registry, generating the modified query statement by appending the second hint to the incoming query statement,
wherein the modified query statement comprises both the first hint and the second hint.

7. The method of claim 6, wherein the target query statement comprises a wildcard expression which matches one or more characters of the incoming query statement.

8. The method of claim 1, further comprising executing the query execution plan.

9. The method of claim 1, further comprising:
finding, in the query hint registry, a second hint record and a third hint record, wherein the second hint record comprises a first target query statement and a second hint paired with the first target query statement, and the third hint record comprises a second target query statement and a third hint paired with the second target query statement, wherein both the first target query statement and the second target query statement match the incoming query statement;
wherein generating the modified query statement comprises appending either the second hint or the third hint, but not both, to the incoming query statement.

10. The method of claim 9, wherein the first target query statement comprises a wildcard expression which matches one or more characters of the incoming query statement, and the second target query statement has no wildcard expression, wherein the modified query statement includes the third hint but not the second hint.

11. A computing system, comprising:
memory;
one or more hardware processors coupled to the memory; and
one or more computer readable storage media storing instructions that, when loaded into the memory, cause the one or more hardware processors to perform operations comprising:
receiving an incoming query statement;
identifying a database object specified in the incoming query statement;
searching a query hint registry for a first hint record which specifies the database object and a first hint paired with the database object, wherein the first hint record is exclusive of any query statement;
responsive to finding the first hint record in the query hint registry, generating a modified query statement by appending the first hint to the incoming query statement; and obtaining a query execution plan based on the modified query statement,
wherein the incoming query statement specifies an explicit hint, wherein the first hint replaces the explicit hint in the modified query statement.

12. The system of claim 11, wherein the database object is a database table or a database view.

13. The system of claim 11, wherein the database object is one of a plurality of database objects specified in the incoming query statement, wherein the operations further comprise:
searching the query hint registry for a second hint record which comprises the plurality of database objects and a second hint paired with the plurality of database objects;
responsive to finding the second hint record in the query hint registry, generating the modified query statement by appending the second hint to the incoming query statement.

14. The system of claim 13, wherein the modified query statement comprises both the first hint and the second hint.

15. The system of claim 11, wherein the query hint registry comprises a plurality of hint records, wherein a hint record comprises (i) a hint and a target object paired with the hint, or (ii) a hint and a target query statement paired with the hint.

16. The system of claim 11, wherein the operations further comprise:
searching the query hint registry for a second hint record which comprises a target query statement and a second hint paired with the target query statement, wherein the target query statement matches the incoming query statement;
responsive to finding the second hint record in the query hint registry, generating the modified query statement by appending the second hint to the incoming query statement,
wherein the modified query statement comprises both the first hint and the second hint.

17. The system of claim 16, wherein the target query statement comprises a wildcard expression which matches one or more characters of the incoming query statement.

18. The system of claim 11, wherein the operations further comprise:
finding, in the query hint registry, a second hint record and a third hint record, wherein the second hint record comprises a first target query statement and a second hint paired with the first target query statement, and the third hint record comprises a second target query statement and a third hint paired with the second target query statement, wherein both the first target query statement and the second target query statement match the incoming query statement;
wherein generating the modified query statement comprises appending either the second hint or the third hint, but not both, to the incoming query statement.

19. The system of claim 18, wherein the first target query statement comprises a wildcard expression which matches one or more characters of the incoming query statement, and the second target query statement has no wildcard expression, wherein the modified query statement includes the third hint but not the second hint.

20. One or more non-transitory computer-readable media having encoded thereon computer-executable instructions causing one or more processors to perform a method comprising:
receiving an incoming query statement;
identifying a database object specified in the incoming query statement;
searching a query hint registry for a first hint record which specifies the database object and a first hint paired with the database object, wherein the first hint record is exclusive of any query statement;
responsive to finding the first hint record in the query hint registry, generating a modified query statement by appending the first hint to the incoming query statement;
obtaining a query execution plan based on the modified query statement; and
executing the query execution plan,
wherein the incoming query statement specifies an explicit hint, wherein the first hint replaces the explicit hint in the modified query statement.

* * * * *